US012751807B2

(12) United States Patent
Wu et al.

(10) Patent No.: US 12,751,807 B2
(45) Date of Patent: Oct. 6, 2026

(54) LIGHT-EMITTING MODULE, LIGHT SOURCE AND DENTAL PHOTOCURING MACHINE

(71) Applicant: GUILIN WOODPECKER MEDICAL INSTRUMENT CO., LTD., Guilin (CN)

(72) Inventors: Xunxian Wu, Guilin (CN); Benqin Zhang, Guilin (CN); Fengwen Wei, Guilin (CN); Jiabing Xu, Guilin (CN)

(73) Assignee: GUILIN WOODPECKER MEDICAL INSTRUMENT CO., LTD., Guilin (CN)

( * ) Notice: Subject to any disclaimer, the term of this patent is extended or adjusted under 35 U.S.C. 154(b) by 0 days.

(21) Appl. No.: 18/687,292

(22) PCT Filed: Jun. 25, 2023

(86) PCT No.: PCT/CN2023/102063
§ 371 (c)(1),
(2) Date: Feb. 27, 2024

(87) PCT Pub. No.: WO2024/051274
PCT Pub. Date: Mar. 14, 2024

(65) Prior Publication Data

US 2025/0195190 A1 Jun. 19, 2025

(30) Foreign Application Priority Data

Sep. 9, 2022 (CN) ......................... 202211105418.X

(51) Int. Cl.
*A61C 13/15* (2006.01)

(52) U.S. Cl.
CPC .................................. *A61C 19/003* (2013.01)

(58) Field of Classification Search
CPC .......................... A61C 19/003; B29C 35/0805
See application file for complete search history.

(56) References Cited

U.S. PATENT DOCUMENTS

2012/0012867 A1* 1/2012 Shen ..................... H10W 90/00 257/89
2016/0076731 A1* 3/2016 Mönch .................... F21V 17/06 362/97.1

(Continued)

FOREIGN PATENT DOCUMENTS

CN 103175166 A 6/2013
CN 203240331 U 10/2013

(Continued)

OTHER PUBLICATIONS

The search report of counterpart EP application No. 23855829.0 issued on Oct. 8, 2025.

(Continued)

*Primary Examiner* — Evan P Dzierzynski
(74) *Attorney, Agent, or Firm* — The Sun IP Law

(57) ABSTRACT

Disclosed is a light-emitting module, a light source and a dental photocuring machine, relating to a technical field of oral medical instruments. On the basis of arranging a plurality of light-emitting units as a whole in a rectangular array in a preset rectangular area, light-emitting units arranged in a rectangular array in a concentric rectangular central area in the preset rectangular area contain at least two second light-emitting units, and each first light-emitting unit and second light-emitting unit in the preset rectangular area are symmetrically distributed about a center point of the preset rectangular area, therefore, light with different colors, namely, light with first color emitted by the first light-emitting unit and light with second color emitted by the second light-emitting unit are mixed into more uniform color-mixed light.

14 Claims, 12 Drawing Sheets

(56) References Cited

U.S. PATENT DOCUMENTS

| | | | | |
|---|---|---|---|---|
| 2016/0265748 | A1* | 9/2016 | Abe | H05B 45/40 |
| 2018/0206956 | A1* | 7/2018 | Pierson | A61C 19/003 |
| 2020/0020675 | A1 | 1/2020 | Vissenberg | |
| 2020/0301262 | A1* | 9/2020 | Fan | F21V 9/30 |

FOREIGN PATENT DOCUMENTS

| | | | |
|---|---|---|---|
| CN | 111722462 | A | 9/2020 |
| CN | 216667321 | U | 6/2022 |
| CN | 218247467 | U | 1/2023 |
| CN | 115670728 | A | 2/2023 |
| EP | 1260193 | A2 | 11/2002 |
| JP | 2004329441 | A | 11/2004 |
| KR | 100620133 | B1 | 9/2006 |
| WO | 2018114527 | A1 | 6/2018 |

OTHER PUBLICATIONS

The first search report of counterpart CN application No. 202211105418.X issued on Sep. 15, 2025.
The international search report of counterpart PCT application No. PCT/CN2023/102063 mailed on Sep. 21, 2023.

* cited by examiner

LIGHT-EMITTING MODULE, LIGHT SOURCE AND DENTAL PHOTOCURING MACHINE

CROSS-REFERENCE TO RELATED APPLICATION(S)

The present disclosure is a national stage application of International Patent Application No. PCT/CN2023/102063, which is filed on Jun. 25, 2023 and claims priority to patent application No. 202211105418.X, filed to the China National Intellectual Property Administration on Sep. 9, 2022 and entitled "Light-Emitting Module, Light Source and Dental Photocuring Machine".

TECHNICAL FIELD

The disclosure relates to the technical field of oral medical instruments, in particular to a light-emitting module, a light source and a dental photocuring machine.

BACKGROUND

Photocuring refers to a process of curing a photocurable material such as a monomer, oligomer or polymer matrix under the induction of light. The photocuring technology is widely applied to the fields of dentistry, 3D printing and the like, and has advantages of high efficiency, wide adaptability, economy, energy conservation, environmental protection and the like.

A photoinitiator is a key component of the photocurable material, which plays a decisive role in photocuring speed of the photocurable material. The photoinitiator is a substance that may absorb radiation energy and undergo a photochemical change upon excitation to produce a reactive intermediate with the ability to initiate polymerization.

The photoinitiator contained in the photocurable material may vary from manufacturer to manufacturer or from type to type. Different photoinitiators need to absorb light in the corresponding wavelength range for optimal reaction efficiency, so different photocurable materials need to be irradiated with light of the corresponding wavelength for curing more efficiently. For this reason, in order to adapt to different photoinitiators, light emitted from a light source of a current dental photocuring machine is usually mixed-color light formed by mixing two lights with different colors.

The light source of the current dental photocuring machine includes direct light emitting, that is, light rays emitted by the light source are directly emitted through a lens. Although the form of direct light emitting of the light source has advantages of good condensation effect, small divergence angle and strong penetrability, the light with different colors emitted by the light source is not uniformly mixed, so that a curing effect of the photocurable material in a local area may be influenced.

SUMMARY

Some embodiments of the disclosure provide a light-emitting module, a light source and a dental photocuring machine, in which light with different colors is mixed more uniformly, so that a curing efficiency of a photoinitiator may be guaranteed, and further, the curing effect of a photocurable material is guaranteed.

A first aspect of the disclosure provides a light-emitting module, which includes a plurality of light-emitting units arranged in a rectangular array in a rectangular light-emitting area, wherein the rectangular light-emitting area is a smallest rectangular area containing all the plurality of light-emitting units.

All the plurality of light-emitting units are divided into a plurality of first light-emitting units and at least one second light-emitting unit according to different light-emitting colors.

A center of the rectangular light-emitting area is a reference center.

When a number of the at least one second light-emitting unit is one, the second light-emitting unit is located at the reference center.

When a number of the second light-emitting units is an odd number greater than or equal to 3, one second light-emitting unit is located at the reference center, and the other second light-emitting units are divided into a plurality of array groups.

When a number of the second light-emitting units is an even number, all the second light-emitting units are divided into a plurality of array groups.

Second light-emitting units in each of the array groups are distributed in an annular array or a rectangular array, and distances between second light-emitting units in the same array group and the reference center are equal.

When a number of the each of the array groups is greater than or equal to 2, distances between second light-emitting units in at least one array group and the reference center is smaller than distances between second light-emitting units in the other array groups and the reference center.

In an alternative implementation mode, when the number of the second light-emitting units is an odd number greater than or equal to 3 and the number of the array groups is greater than or equal to 2, all the array groups include a central array group and at least one peripheral array group, and one of the second light-emitting units located at the reference center is a reference light-emitting unit.

Except the reference light-emitting unit, a distance between a second light-emitting unit in the central array group and the reference center is smaller than or equal to a distance between the other light-emitting unit and the reference center; and a second light-emitting unit in the peripheral array group is located at an edge of the rectangular light-emitting area.

In an alternative implementation mode, the rectangular light-emitting area has a sub light-emitting area concentric with itself, and the length direction and width direction of the sub light-emitting area are respectively in a same direction as the length direction and width direction of the rectangular light-emitting area.

Light-emitting units in the sub light-emitting area contain the reference light-emitting unit and all the second light-emitting units of the central array group, and second light-emitting units of the central array group are all located at an edge of the sub light-emitting area.

In an alternative implementation mode, when the number of the second light-emitting units is an even number and the number of the array groups is greater than or equal to 2, all the array groups include a central array group and at least one peripheral array group.

A distance between at least one second light-emitting unit in the central array group and the reference center is smaller than or equal to a distance between the other light-emitting unit and the reference center.

At least one second light-emitting unit in each of the at least one peripheral array group is located at an edge of the rectangular light-emitting area.

In an alternative implementation mode, the rectangular light-emitting area has a sub light-emitting area concentric with itself, and the length direction and width direction of the sub light-emitting area are respectively in a same direction as the length direction and width direction of the rectangular light-emitting area.

Wherein all the light-emitting units in the sub light-emitting area contain all the second light-emitting units of the central array group, and the second light-emitting units of the central array group are all located at an edge of the sub light-emitting area.

In an alternative implementation mode, the light-emitting units in the sub light-emitting area are all second light-emitting units.

In an alternative implementation mode, in each row or column of the light-emitting units in the sub light-emitting area, at least two light-emitting units adjacent and with a same spectral peak wavelength are constructed as a whole structure.

In an alternative implementation mode, in all the light-emitting units, light-emitting units in a previous row and a next row outside the sub light-emitting area are all the first light-emitting units.

In an alternative implementation mode, in all the light-emitting units, light-emitting units in a previous row and a next row outside the sub light-emitting area all contain the first light-emitting unit and the second light-emitting unit.

In an alternative implementation mode, in all the light-emitting units, light-emitting units in a previous column and a next column outside the sub light-emitting area all contain the first light-emitting unit and the second light-emitting unit.

In an alternative implementation mode, light-emitting units in each row or each column server as an electrical module.

Wherein electrical modules are connected in parallel, and equivalent resistance values of the electrical modules are the same.

In an alternative implementation mode, all the light-emitting units in the sub light-emitting area serve as a first electrical module, and the first electrical module is connected to a first power supply.

Except the row or column where the light-emitting units forming the first electrical module are located, the other light-emitting units in the same row or column are connected in series to form a second electrical module.

The other light-emitting units except those forming the first electrical module and the second electrical module are connected in series to form a third electrical module.

The second electrical module and the third electrical module are connected in parallel to a second power supply.

Wherein equivalent resistance values of the first electrical module, the second electrical module and the third electrical modules are the same.

In an alternative implementation mode, all the light-emitting unit are divided into a plurality of electrical modules, each of the electrical modules contains a plurality of connected light-emitting units, and equivalent resistance values of the electrical modules are the same.

In an alternative implementation mode, light-emitting units in each row or each column server as an electrical module, and all the electrical modules are connected in parallel to a power supply.

In an alternative implementation mode, all the first light-emitting units are divided into at least one type according to different spectral peak wavelengths, and spectral peak wavelengths of first light-emitting units of a same type are the same.

In an alternative implementation mode, all the first light-emitting units of the same type are divided into a plurality of arrangement groups.

First light-emitting units in each of the arrangement groups are distributed in an annular array or a rectangular array, and distances between all the first light-emitting units in the each of the arrangement groups and the reference center are equal.

In an alternative implementation mode, in the rectangular light-emitting area, in each row or column of the light-emitting units, at least two light-emitting units adjacent and with a same spectral peak wavelength are constructed as a whole structure.

A second aspect of the disclosure provides a light source, which includes a substrate, and the light-emitting module of any of the above implementation modes.

The light-emitting module of any of the above implementation modes is disposed on the substrate.

A third aspect of the disclosure provides a dental photocuring machine, which includes the light source of the above implementation mode.

The embodiments of the disclosure have the following beneficial effects.

When the number of the second light-emitting unit is only one, it is distributed in the center of the rectangular light-emitting area, or when the number of the second light-emitting units is two or more, the second light-emitting units in each array group are distributed in a rectangular or annular array, so that light emitted by the first light-emitting units and the second light-emitting units with different light-emitting colors may be mixed more uniformly, thus ensuring the curing efficiency of the photoinitiator and further ensuring the curing effect of the photocurable material when the dental photocuring machine with the light-emitting module is used to irradiate the photocurable material.

BRIEF DESCRIPTION OF THE DRAWINGS

In order to describe the specific implementation modes of the disclosure or the technical solutions in the relevant art more clearly, the drawings required to be used in descriptions about the specific implementation modes or the relevant art will be simply introduced below, obviously, the drawings described below are only some implementation modes of the disclosure, and other drawings can further be obtained by those of ordinary skill in the art according to the drawings without creative work.

REFERENCE NUMERALS

Figure 1:
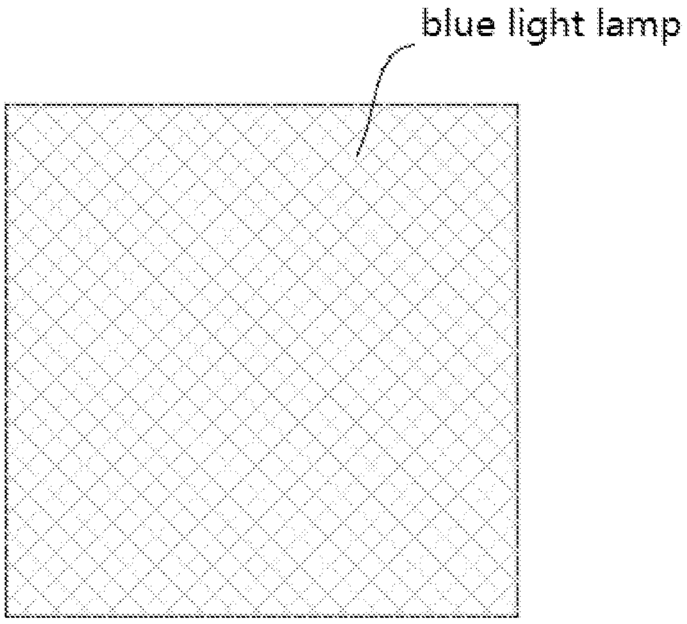
FIG. 1 is schematic diagram I of chip arrangement of an existing light source.

10. Rectangular light-emitting area; 21. First array group; 22. Second array group; 23. Third array group; 30. First light-emitting unit; 31. Light-emitting unit of first type; 32. Light-emitting unit of second type; 33. Light-emitting unit of third type; 40. Second light-emitting unit; 41. Reference light-emitting unit; 51. First arrangement group; 52. Second arrangement group; 53. Third arrangement group; 54. Fourth arrangement group; 55. Fifth arrangement group; and 56. Sixth arrangement group.

DETAILED DESCRIPTION OF THE EMBODIMENTS

In order to make the purpose, the technical solutions and the advantages of the embodiments of the disclosure clearer, the technical solutions in the embodiments of the disclosure will be clearly and completely described below in combination with the drawings in the embodiments of the disclosure, and it is apparent that the described embodiments are only a part rather all of embodiments of the disclosure. Components of the embodiments of the disclosure generally described and illustrated here in the drawings may be arranged and designed in various different configurations.

Therefore, the following detailed descriptions of the embodiments of the disclosure provided in the drawings are not intended to limit the scope of the claimed disclosure, but only represent selected embodiments of the disclosure. All other embodiments obtained by those of ordinary skill in the art based on the embodiments of the disclosure without creative efforts shall fall within the protection scope of the disclosure.

It is to be noted that similar numbers and letters indicate similar items in the following drawings, so once a certain item is defined in one drawing, no further definitions and explanations are required for same in the subsequent drawings.

In the descriptions of the disclosure, it is to be noted that the orientation or location relationships indicated by the terms "center", "upper", "lower", "left", "right", "vertical", "horizontal", "inner", "outer", and the like are orientation or location relationships shown on the basis of the drawings, or the usual orientation or location relationship of the product of the disclosure when in use, which are only for the convenience of describing the disclosure and simplifying the descriptions, rather than indicating or implying that the referred apparatuses or elements must have a specific orientation, and be constructed and operated in the specific orientation. Therefore, it cannot be understood as a limitation of the present disclosure. In addition, terms "first", "second" and "third" are only used for describing purposes, and cannot be understood as indicating or implying relative importance.

In addition, terms "horizontal", "vertical" and "pendulous" do not mean that components are required to be absolutely horizontal or pendulous, but can be slightly inclined. For example, "horizontal" only means that its direction is more horizontal than "vertical", which does not mean that the structure must be completely horizontal, but can be slightly inclined.

In the descriptions of the disclosure, it is also to be noted that, unless otherwise specified and defined, terms "dispose", "install", "mutually connect", and "connect" should be generally understood. For example, the term may be fixed connection, or detachable connection, or integral connection, or mechanical connection, or electric connection. The term may be direct connection, or indirect connection through an intermediate, or communication inside two elements. Those of ordinary skill in the art may understand the meanings of the terms in the present disclosure according to an actual situation.

A light source of a current dental photocuring machine mainly includes two forms, including direct light emitting and light emitting through a light guide rod, and light emitting through the light guide rod means that light emitted by a light source is emitted through the light guide rod. Light of two colors is mixed in the light guide rod after refraction and reflection, emitted light is good in mixing uniformity, but has the problems of poor condensation effect and large divergence angle, meanwhile, in combination with loss of light in the light guide rod, the penetration of light is insufficient, and consequently, the efficiency of light curing is affected.

Direct light emitting means that light emitted by the light source is directly emitted through a lens. Light emitted in this form has advantages of good condensation effect, small divergence angle and strong penetrability, but the light with different colors emitted by the light source is not uniformly mixed, so that the curing effect of a photocurable material in a local area may be influenced.

In a relevant art, a light source of a current dental photocuring machine is composed of a chip made of an LED chip, and the LED chip in the light source mainly includes following arrangement structures.

1. Light of single color: as shown in FIG. 1, an LED chip that can emit blue light is used.

Under irradiation of blue light, most of photoinitiators have a certain gain on the curing efficiency of the photocurable material. However, because an emitted light is a single color, this structure may only be applied to photoinitiators that can react under blue light.

Figure 2:
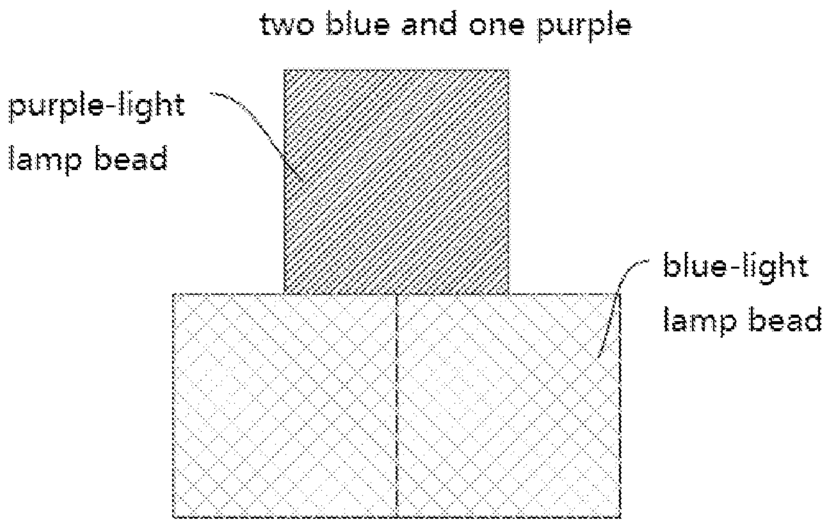
FIG. 2 is schematic diagram II of chip arrangement of an existing light source.

2. Light with different colors:

2.1 As shown in FIG. 2, three LED chips are arranged in a "Chinese character Pin shape", two chips that can emit blue light are located below, one chip that can emit purple light is located above the two blue chips, and spectral peak wavelengths of blue light emitted by the two blue chips are the same.

For ease of description, hereinafter, the LED chip that can emit blue light is called blue chip, and the LED chip that can emit purple light is called purple chip.

Figure 3:
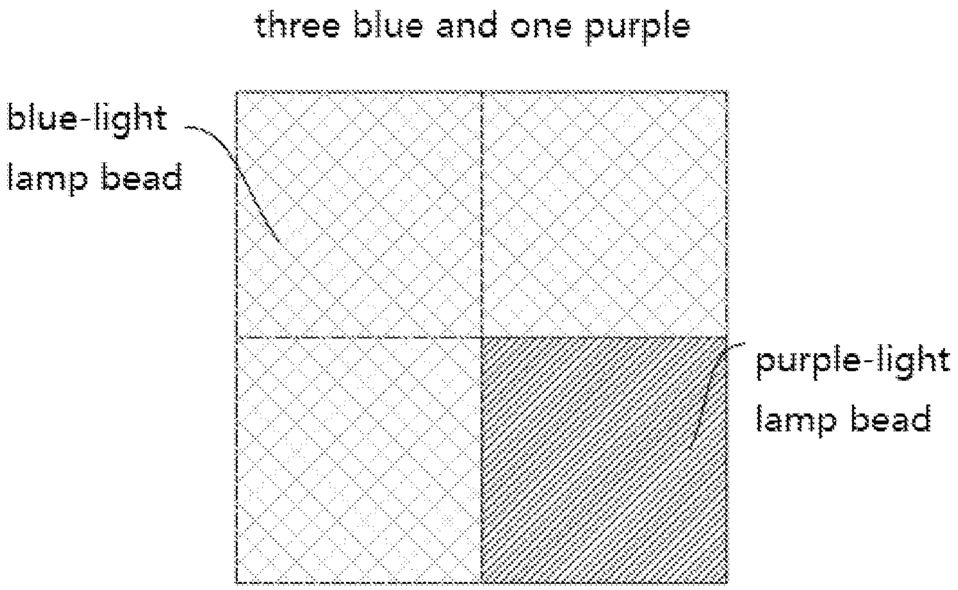
FIG. 3 is schematic diagram III of chip arrangement of an existing light source.

2.2 As shown in FIG. 3, four LED chips are arranged in a rectangular shape, including three blue chips and one purple chip, and spectral peaks of blue light emitted by the three blue chips are the same.

Figure 4:
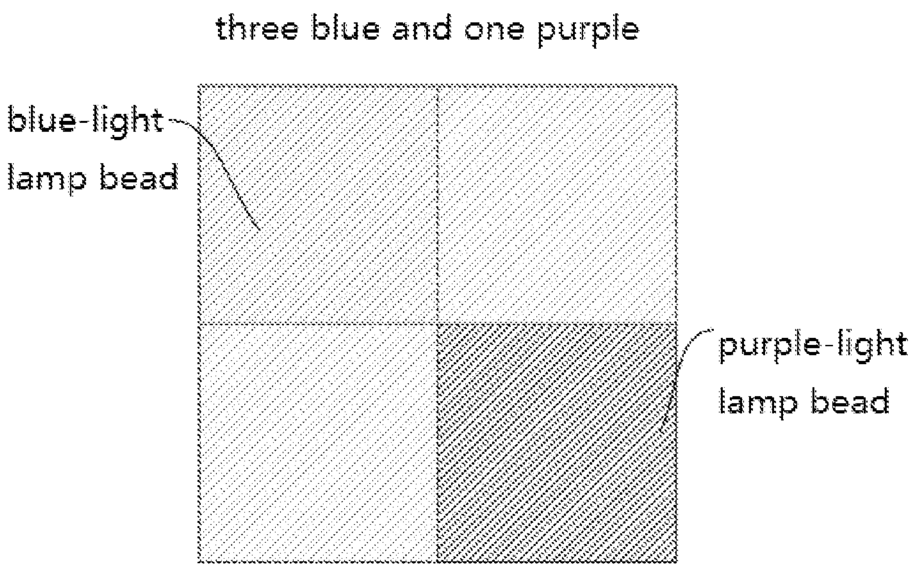
FIG. 4 is schematic diagram IV of chip arrangement of an existing light source.

2.3 As shown in FIG. 4, four LED chips are arranged in a rectangular shape, including two first blue chips, one second blue chip and one purple chip, and peak wavelengths of blue light emitted by the first blue chip and the second blue chip are different.

In the LED arrangement structures that emit color of different colors illustrated above, when the form of direct light emitting is adopted, an area that may be covered by purple light is obviously smaller than an area that may be covered by blue light, and purple light is distributed at an edge position, so uniform mixing of blue light and purple light cannot be realized. If the photoinitiator in the photocurable material may act on curing efficiency of the photocurable material only under irradiation of purple light, the curing effect of the photocurable material may be affected by nonuniform mixing of blue light and purple light.

To this end, the inventor, after research, provides the following embodiment to improve the defect of nonuniform mixing of light of different colors under the form of direct light emitting. Some implementation modes of the disclosure will be described in detail below with reference to the drawings. It is not be noted that the embodiments and features in the embodiments below may be combined with each other without conflict.

Some embodiments of the disclosure provide a light source, which may be used on a dental photocuring machine, and the light source includes a substrate and a light-emitting module disposed on a side of the substrate. The substrate may be made of materials with good thermal conductivity such as copper and aluminum, so in addition to being able to install the light-emitting module, it may also play a role in heat dissipation.

The light-emitting module includes a plurality of light-emitting units disposed in a rectangular array in a rectangular light-emitting area 10, and the rectangular light-emitting area 10 is the smallest rectangular area containing all the light-emitting units.

All the light-emitting units are divided into a plurality of first light-emitting units 30 and at least one second light-emitting unit 40 according to different light-emitting colors, and thus light-emitting colors of the first light-emitting units 30 and the at least one second light-emitting unit 40 are different.

A center of the rectangular light-emitting area 10 is defined as a reference center.

When the number of the second light-emitting unit 40 is one, the second light-emitting unit 40 is located at the reference center, namely, the second light-emitting unit 40 is disposed concentric with the rectangular light-emitting area 10.

When the number of the second light-emitting unit 40 is an odd number greater than or equal to 3, one second light-emitting unit 40 is located at the reference center, and the other second light-emitting units 40 are divided into at least one array group; the number of the second light-emitting unit 40 in each array group is at least two, the second light-emitting units 40 in the each array group are distributed in a rectangular array or are distributed in an annular array about the reference center, and distances between the second light-emitting units 40 in the each array group and the reference center are equal.

Wherein, the second light-emitting unit 40 located at the reference center may be defined as a reference light-emitting unit, if the number of the array group is one, the second light-emitting units 40 in the array group may be at any position in the rectangular light-emitting area 10, for example, at an edge of the rectangular light-emitting area 10, namely, the second light-emitting units in the array group are at a position closest to a boundary of the rectangular light-emitting area 10, of course, also may be located at a position adjacent to the reference light-emitting unit, namely, the second light-emitting units 40 in the array group are directly adjacent to the reference light-emitting unit, and there are no any other light-emitting units disposed therebetween.

When the number of the second light-emitting unit 40 is an even number, all the second light-emitting units 40 are divided into at least one array group; similarly, the number of the second light-emitting unit 40 in each array group is at least two, the second light-emitting units 40 in the each array group are distributed in a rectangular array or are distributed in an annular array about the reference center, and distances between the second light-emitting units 40 in the each array group and the reference center are equal.

When the number of the array group is one, the second light-emitting units 40 in the array group may be located at any position in the rectangular light-emitting area 10, for example, each second light-emitting unit 40 is located at an edge of the rectangular light-emitting area 10, that is, the second light-emitting units 40 in the array group are at the position closest to the boundary of the rectangular light-emitting area.

Of course, it is to be noted that no matter whether the number of second light-emitting unit 40 is an even number or an odd number greater than or equal to 3, when the number of the array groups is greater than or equal to 2, the distance between the second light-emitting unit 40 in at least one array group and the reference center is smaller than the distance between the second light-emitting unit 40 in the other array group and the reference center, so that the arrangement of the second light-emitting units 40 more hierarchical, thus avoiding excessively concentrated distribution of the second light-emitting units 40.

Therefore, by disposing the first light-emitting unit 30 and the second light-emitting unit 40 in the above arrangement form, light emitted by the first light-emitting unit 30 and the second light-emitting unit 40 with different light-emitting colors may be mixed more uniformly, thus ensuring the curing efficiency of the photoinitiator and further ensuring the curing effect of the photocurable material when the dental photocuring machine with the light-emitting module is used to irradiate the photocurable material.

All the light-emitting units are arranged in a rectangular array in the rectangular light-emitting area 10, and are divided into first light-emitting units 30 and second light-emitting units 40 according to different light-emitting colors, and therefore, when the second light-emitting units 40 are arranged according to the above form, the position of the first light-emitting unit 30 is also determined.

The first light-emitting unit emits light with first color, and the second light-emitting unit emits light with second color. Energy of blue light and purple light is higher than that of other colors (since ultraviolet light may harm the human body, ultraviolet light is not used based on safety and other considerations), meanwhile, light with the optimal wavelength that may be absorbed by the photoinitiator in the dental photocurable material is also located at areas corresponding to blue light and purple light, and therefore, one of the light with first color and the light with second color is blue light, and the other is purple light.

In the embodiment, illustration is made by taking the light with the first color as blue light and the light with second color as purple light. The first light-emitting unit 30 adopts the LED chip that may emit blue light, and the second light-emitting unit 40 adopts the LED chip that may emit purple light. The value range of spectral peak wavelength of blue light may be 420 nm-480 nm, and the value range of spectral peak wavelength of purple light may be 380 nm-420 nm.

Of course, in other embodiments, the light with first color and the light with second color may be reversed, that is, the light with first color is purple light and the light with second color is blue light, and no elaboration will be made here.

Figure 5:
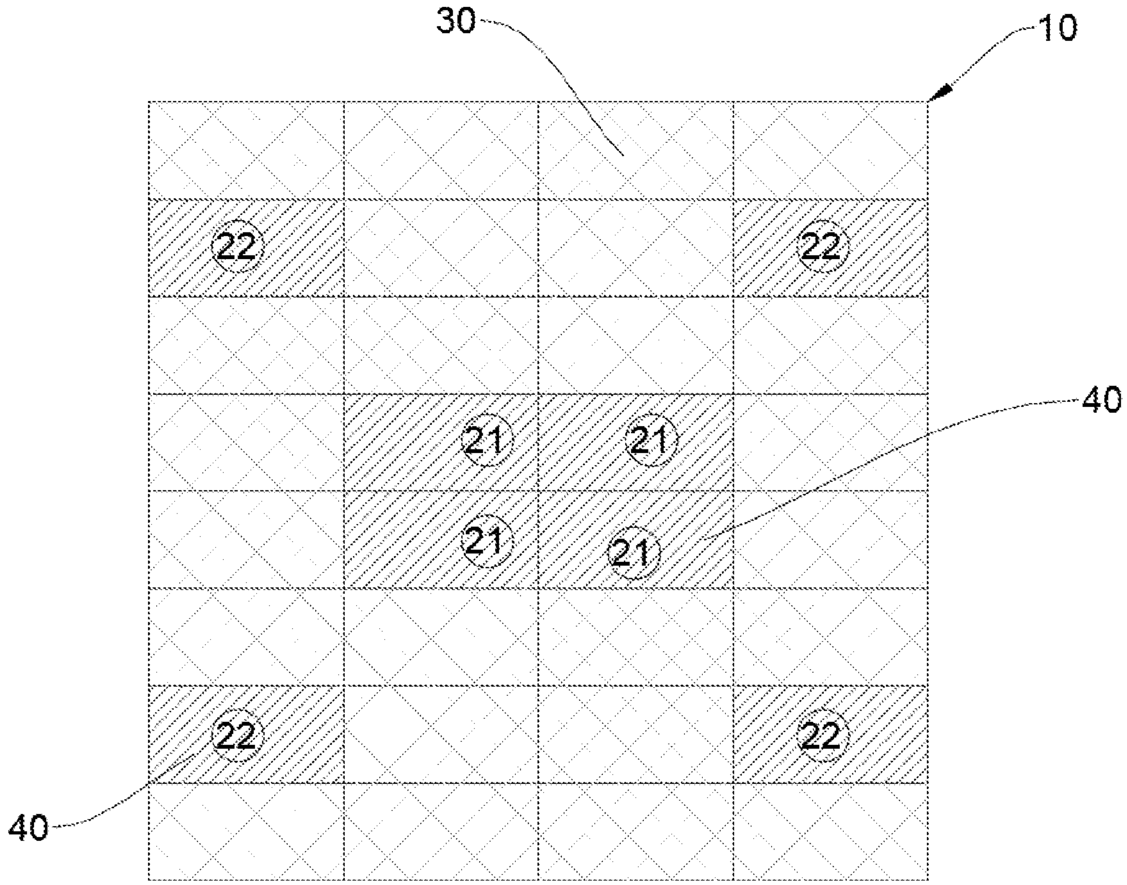
FIG. 5 is a schematic diagram I of arrangement structure of a light-emitting module according to an embodiment of the disclosure.

In the light-emitting mode shown in FIG. 5, the number of the second light-emitting units 40 is an even number and the number of the array groups is greater than or equal to 2, all the array groups include a central array group and at least one peripheral array group.

The distance between the second light-emitting unit 40 in the central array group and the reference center is smaller than or equal to the distance between the other light-emitting unit and the reference center. In other words, the distance between any second light-emitting unit 40 in the central array group and the reference center is smaller than or equal to the distance between any light-emitting unit except that of the central array group in all the light-emitting units in the rectangular light-emitting area 10 and the reference center. That is, the second light-emitting unit 40 in the central array group is closest the reference center among all the light-emitting units.

The second light-emitting unit in each peripheral array group is located at the edge of the rectangular light-emitting area.

In this way, by disposing the second light-emitting unit 40 at a position closest to the reference center in the rectangular light-emitting area 10, and by disposing the second light-emitting unit 40 at a position closest to the edge of the rectangular light-emitting area 10, uniform mixing of light emitted by the first light-emitting unit 30 and the second light-emitting unit 40 respectively is facilitated.

Furthermore, the rectangular light-emitting area 10 has a sub light-emitting area concentric with itself, the length direction and width direction of the sub light-emitting area are respectively in the same direction as the length direction and width direction of the rectangular light-emitting area 10, namely, the length direction of the sub light-emitting area is parallel to the length direction of the rectangular light-emitting area 10, and the width direction of the sub light-emitting area is parallel to the width direction of the rectangular light-emitting area 10; and all the light-emitting units in the sub light-emitting area contain all second light-emitting units of the central array group, and the second light-emitting units of the central array group are all located at the edge of the sub light-emitting area. That is, each second light-emitting unit 40 of the central array group is located at a position closest to the edge of the sub light-emitting area.

It is to be noted that, in the light-emitting module shown in FIG. 5, the light-emitting units in the sub light-emitting area are all second light-emitting units 40, so as to further improve brightness and uniformity of light spots. In addition, if only the light-emitting units in the sub light-emitting area are lighted, a more concentrated light of second color may be emitted, thereby forming light spots with uniform brightness and large coverage area, so as to facilitate detection of dental plaque, dental calculus, tooth cracks and dental caries.

With further reference to FIG. 5, in the light-emitting module shown in FIG. 5, all the light-emitting units in the rectangular light-emitting area 10 are arranged in a rectangular array of eight rows and four columns, and two array groups are contained, which are respectively the first array group 21 and the second array group 22 in rectangular array distribution as shown in FIG. 5.

The first array group 21 is the central array group, which contains four second light-emitting units 40, the four second light-emitting units in the first array group 21 are distributed in a rectangular array in two rows and two columns, a corresponding sub light-emitting area contains four second light-emitting units 40, and the four second light-emitting units 40 are respectively the second and third of the fourth row and the second and third of the fifth row of all light-emitting units in the rectangular light-emitting area 10, respectively.

The second array group 22 is the above peripheral array group, which also contains four second light-emitting units 40, and the four second light-emitting units are respectively the third and fourth of the fifth row and the third and fourth of the sixth row of all light-emitting units in the rectangular light-emitting area 10, respectively.

In such a case, in the light-emitting module shown in FIG. 5, in all the light-emitting units in the rectangular light-emitting area, the light-emitting units in the previous row and the next row outside the sub light-emitting area are all the first light-emitting units 30. Meanwhile, the light-emitting units in the previous column and the next column outside the sub light-emitting area all contain the first light-emitting unit 30 and the second light-emitting unit 40.

Figure 6:
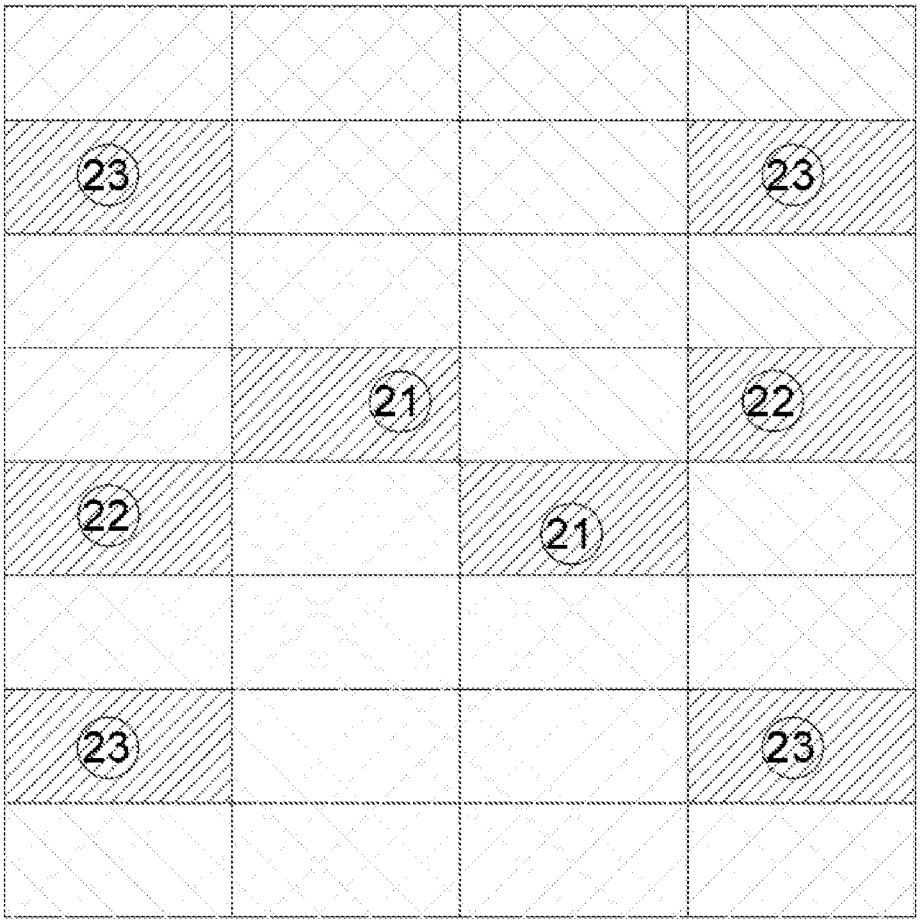
FIG. 6 is a schematic diagram II of arrangement structure of a light-emitting module according to an embodiment of the disclosure.

Of course, it can be understood that in some embodiments, the light-emitting unit in the sub light-emitting area may also contain the first light-emitting unit, such as FIG. 6, the arrangement form of the second light-emitting unit in FIG. 6, compared with FIG. 5, contains three array groups, namely, the first array group 21, the second array group 22 and the third array group 23, the first array group 21 is the central array group, and the second array group 22 and the third array group 23 are both peripheral array groups.

In the light-emitting module shown in FIG. 6, the sub light-emitting area also contains four light-emitting units, but the first array group 21 only includes two second light-emitting units 40, so the first array group 21 is distributed in an annular array, the other two light-emitting units in the sub light-emitting area are both the first light-emitting units 30, because the two second light-emitting units 40 are distributed in the annular array, the first light-emitting unit 30 and the second light-emitting unit 40 are successively arranged in a staggered manner. The second array group 22 contains two second light-emitting units 40, which are the fourth of the fourth row and the first of the fifth row respectively. The third array group 23 contains four second light-emitting units 40, and the arrangement positions of the four second light-emitting units 40 are the same as those of the second array group 22 in FIG. 5, which are the third and fourth of the fifth row and the third and fourth of the sixth row of all light-emitting units. Therefore, the light-emitting units in the previous column and the next column outside the sub light-emitting area all contain the first light-emitting unit 30 and the second light-emitting unit 40.

In the embodiment, all the first light-emitting units 30 are divided into at least one type according to different spectral peak wavelengths, thus adapting to more photoinitiators of different types. The spectral peak wavelengths of the first light-emitting units 30 of each type are the same.

In other embodiments, when the number of the second light-emitting unit 40 is greater than one, all the second light-emitting units 40 are divided into at least one type according to different spectral peak wavelengths, and the spectral peak wavelengths of the second light-emitting units 40 of each type are the same.

In the embodiment, illustration is made by taking the first light-emitting unit 30 as an example. As shown in FIG. 5, all the first light-emitting units 30 are of the same type, and all the second light-emitting units 40 are also of the same type.

In the rectangular light-emitting area 10, in a plurality of light-emitting units of each row or each column, at least two light-emitting units adjacent and with the same spectral peak wavelength are constructed as one, that is, at least two small chips may be replaced with one large chip with approximately the same light-emitting area.

In the embodiment such as FIG. 5, in each row or column of the second light-emitting units 40 of the central array group, at least two second light-emitting units 40 adjacent and with the same spectral peak wavelength are constructed as an integral structure.

Figure 7:
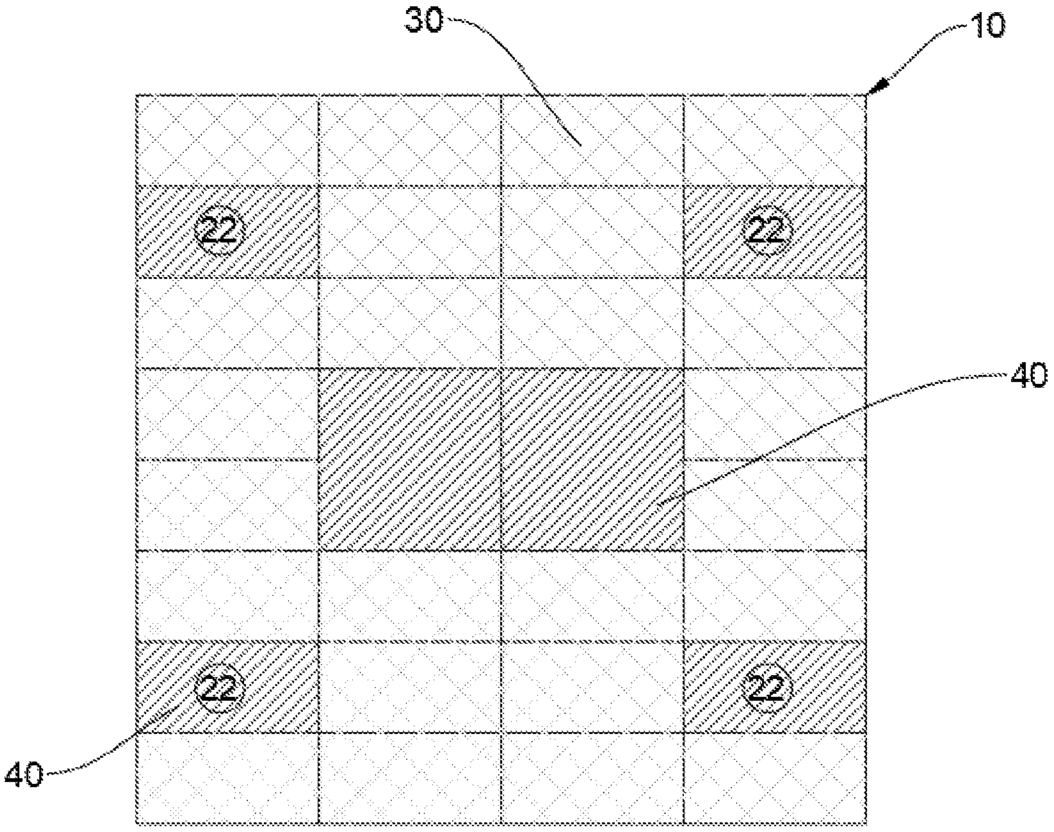
FIG. 7 is a schematic diagram III of arrangement structure of a light-emitting module according to an embodiment of the disclosure.

Specifically, in the four second light-emitting units 40 of the central array group of FIG. 5, two second light-emitting unit 40 of the second column are constructed as an integral structure, two second light-emitting unit 40 of the third column are constructed as one, namely, two large chips are used to replace four small chips in FIG. 5, thus obtaining the light-emitting module as shown in FIG. 7.

Figure 8:
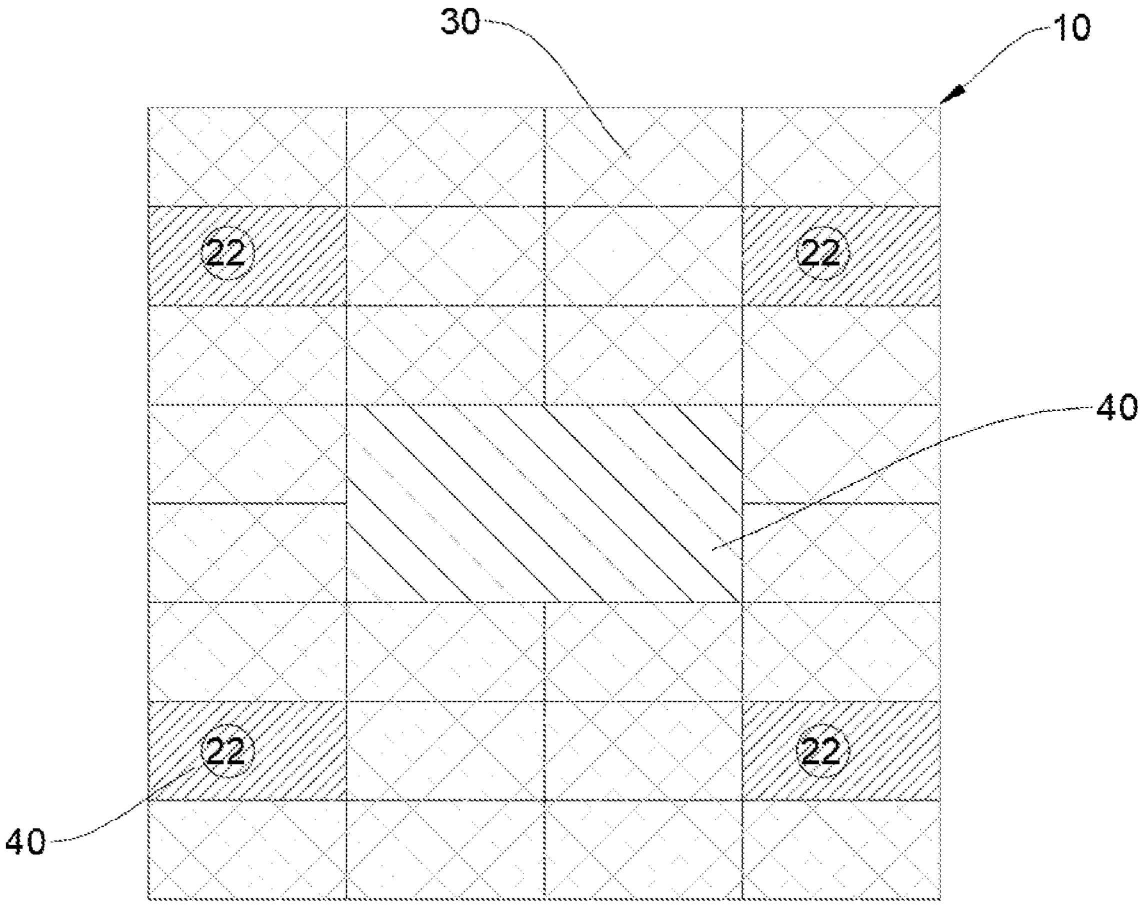
FIG. 8 is a schematic diagram IV of arrangement structure of a light-emitting module according to an embodiment of the disclosure.

Or, four second light-emitting unit 40 of the central array group of FIG. 5 are all constructed as an integral structure, namely, one large chip is used to replace four small chips in FIG. 5, thus obtaining the light-emitting module as shown in FIG. 8.

Figure 9:
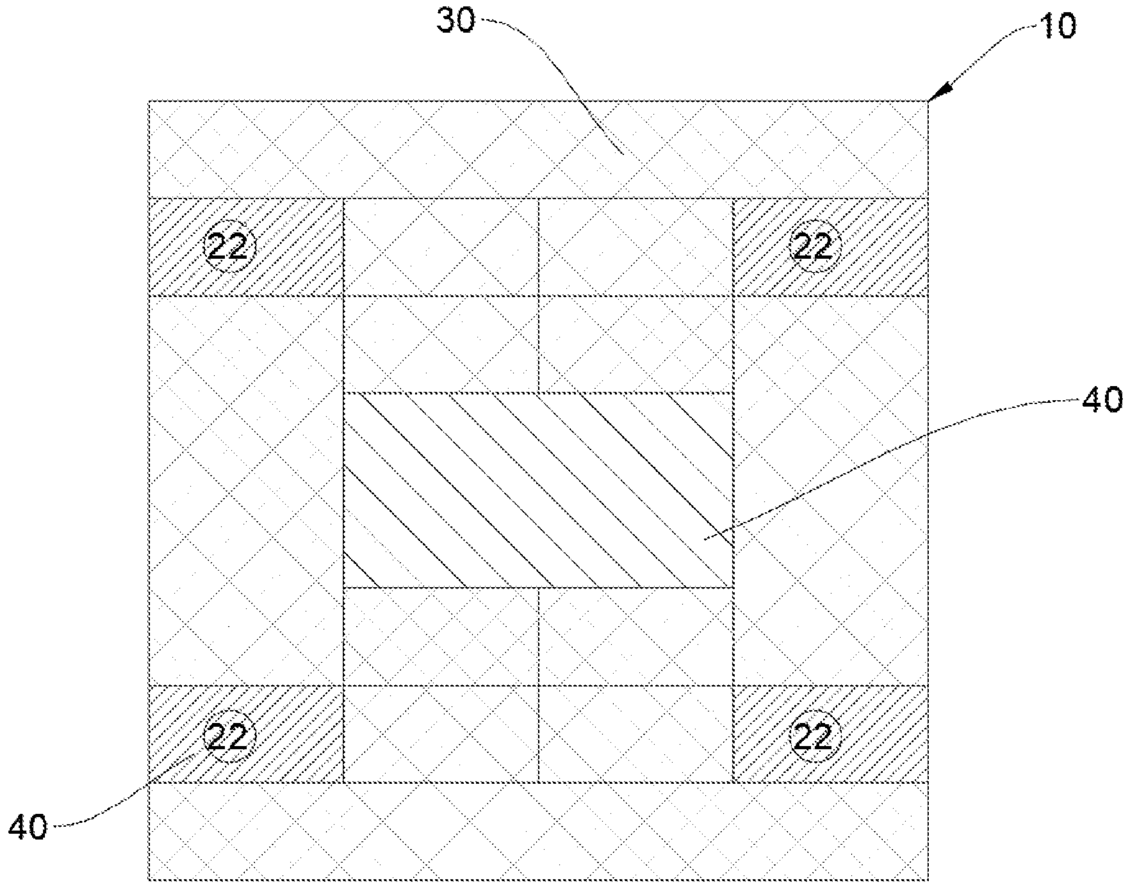
FIG. 9 is a schematic diagram V of arrangement structure of a light-emitting module according to an embodiment of the disclosure.

In addition, in FIG. 8, the first light-emitting units 30 of the first row and the eighth row are of the same type, so that the first light-emitting units 30 of the first row and the eighth row may be constructed as one. Meanwhile, four first light-emitting units 30 between two second light-emitting units 40 of the first column are constructed as one, four first light-emitting units 30 between two second light-emitting units 40 of the fourth column are constructed as one, obtaining the light-emitting module as shown in FIG. 9.

Figure 10:
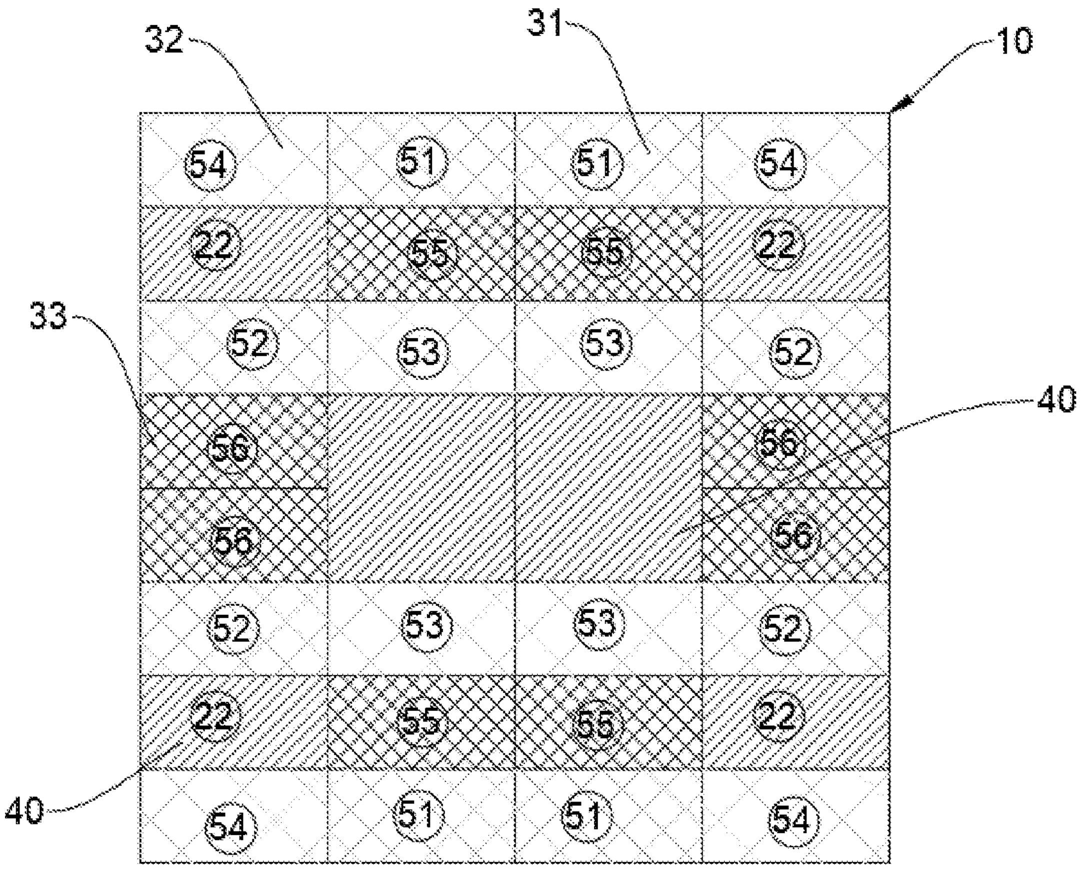
FIG. 10 is a schematic diagram VI of arrangement structure of a light-emitting module according to an embodiment of the disclosure.

Referring to FIG. 10, the light-emitting module shown in FIG. 10 is basically the same as that shown in FIG. 7. The difference is that in the light-emitting module shown in FIG. 10, all the first light-emitting units 30 are divided into three types, including a light-emitting unit of first type 31, a light-emitting unit of second type 32 and a light-emitting unit of third type 33, the light-emitting unit of first type 31 includes at least one first light-emitting unit, a spectral peak wavelength of the light-emitting unit of first type 31 is first wavelength, a spectral peak wavelength of the light-emitting unit of second type 32 is second wavelength, a spectral peak wavelength of the light-emitting unit of third type 33 is third wavelength, and the values of any two of the first wavelength, the second wavelength and the third wavelength are different. If the light with first color is blue light, the value of the first wavelength may be 440 nm, the value of the second wavelength may be 460 nm, and the value of the third wavelength may be 480 nm.

All the first light-emitting units 30 of the same type may be divided into a plurality of arrangement groups, the first light-emitting units 30 in each arrangement group are distributed in a rectangular array or are distributed in an annular array, and the distances between all the first light-emitting units 30 in each arrangement group and the reference center are equal. When the number of the arrangement group divided by all the first light-emitting units 30 of the same type is greater than or equal to two, similar to the rule of the second array group, in all the arrangement groups, the distance between the first light-emitting unit 30 in at least one arrangement group and the reference center is smaller than that between the first light-emitting unit 30 in the other arrangement groups and the reference center. So that the mixing effect among the first light-emitting units 30 of different types is better.

Taking FIG. 10 as an example, all the light-emitting units of first type 31 are divided into two arrangement groups, respectively a first arrangement group 51 and a second arrangement group 52, and the first light-emitting units 30 in the first arrangement group 51 and the first light-emitting units 30 in the second arrangement group 52 are distributed in a rectangular array.

The first arrangement group 51 contains four first light-emitting units 30, and the four first light-emitting units 30 are respectively on the second column and the third column of the first row and the second column and the third column of the eighth row. The second arrangement group 52 contains four first light-emitting units 30, and the four first light-emitting units 30 are respectively on the first column and the fourth column of the third row and the first column and the fourth column of the sixth row respectively.

All the light-emitting units of second type 32 are divided into two arrangement groups, respectively a third arrangement group 53 and a fourth arrangement group 54, and the first light-emitting units 30 in the third arrangement group 53 and the first light-emitting units 30 in the fourth arrangement group 54 are distributed in a rectangular array.

The third arrangement group 53 contains four first light-emitting units 30, and the four first light-emitting units 30 are respectively on the second column and the third column of the third row and the second column and the third column of the sixth row. The fourth arrangement group 54 contains four first light-emitting units 30, and the four first light-emitting units 30 are respectively on the first column and the fourth column of the first row and the first column and the fourth column of the eighth row.

All the light-emitting units of third type 33 are divided into two arrangement groups, respectively the fifth arrangement group 55 and the sixth arrangement group 56, and the first light-emitting units 30 in the fifth arrangement group 55 and the first light-emitting units 30 in the sixth arrangement group 56 are distributed in a rectangular array.

The fifth arrangement group 55 contains four first light-emitting units 30, and the four first light-emitting units 30 are respectively on the second column and the third column of the second row and the second column and the third column of the seventh row. The sixth arrangement group 56 contains four first light-emitting units 30, and the four first light-emitting units 30 are respectively on the third column and the fourth column of the first row and the third column and the fourth column of the fourth row.

Of course, it can be understood that, in some embodiments, two array groups (the first array group and the second array group, or the central array group and the peripheral group) shown in FIGS. 5-11 may be made to emit light with two spectral peak wavelengths respectively, that is, the second light-emitting units 40 of one array group are all of one type, such as the light-emitting unit of fourth type, and the second light-emitting units 40 of the other array group are all of the other type, such as the light-emitting unit of fifth type. The types of the second light-emitting units 40 in two array groups are different, that is, the spectral peak wavelengths of the light-emitting unit of fourth type and the light-emitting unit of fifth type are different.

Figure 11:
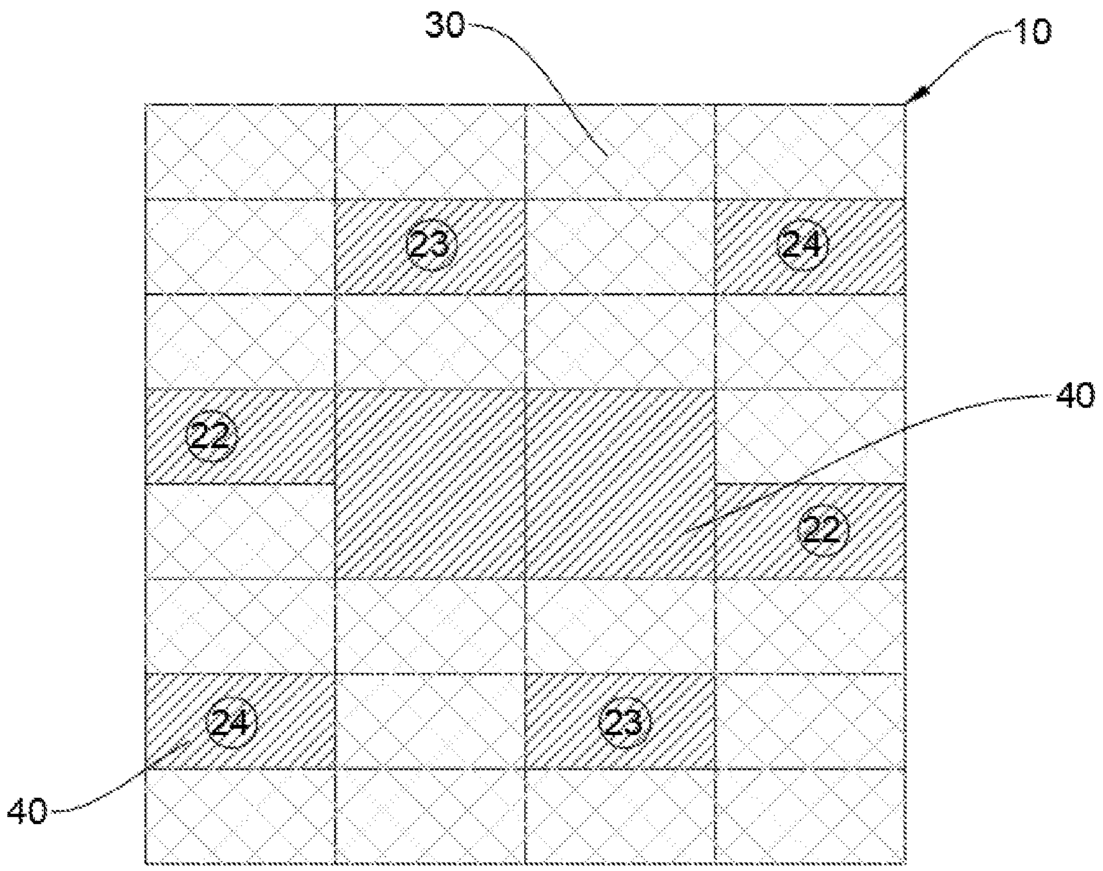
FIG. 11 is a schematic diagram VII of arrangement structure of a light-emitting module according to an embodiment of the disclosure.

Referring to FIG. 11, there are four array groups in FIG. 11, respectively the first array group 21, the second array group 22, the third array group 23 and the fourth array group 24 shown in the figure. In the four array groups, the first array group 21 is located in the middle, so that the first array group 21 is the central array group, and the structure of the central array group is the same as that of the central array group shown in FIG. 7. Two array groups sequentially outward from the first array group 21 are the second array group 22, the third array group 23, and the fourth array group, respectively, and the second array group 22, the third array group 23, and the fourth array group 34 are the peripheral array groups mentioned above.

Specifically, in FIG. 11, the second array group 22, the third array group 23 and the fourth array group 24 respectively contain two second light-emitting units 40, so the second light-emitting units 40 in the second array group 22, the third array group 23 and the fourth array group 24 are distributed in an annular array.

Two second light-emitting units in the second array group 22 are on the fifth row of the first column and the fourth row of the fourth column. Two second light-emitting units 40 in the third array group 23 are on the second of the second column and the seventh row of the third column, and two second light-emitting units 40 in the fourth array group 24 are on the seventh row of the first column and the second row of the fourth column.

Figure 12:
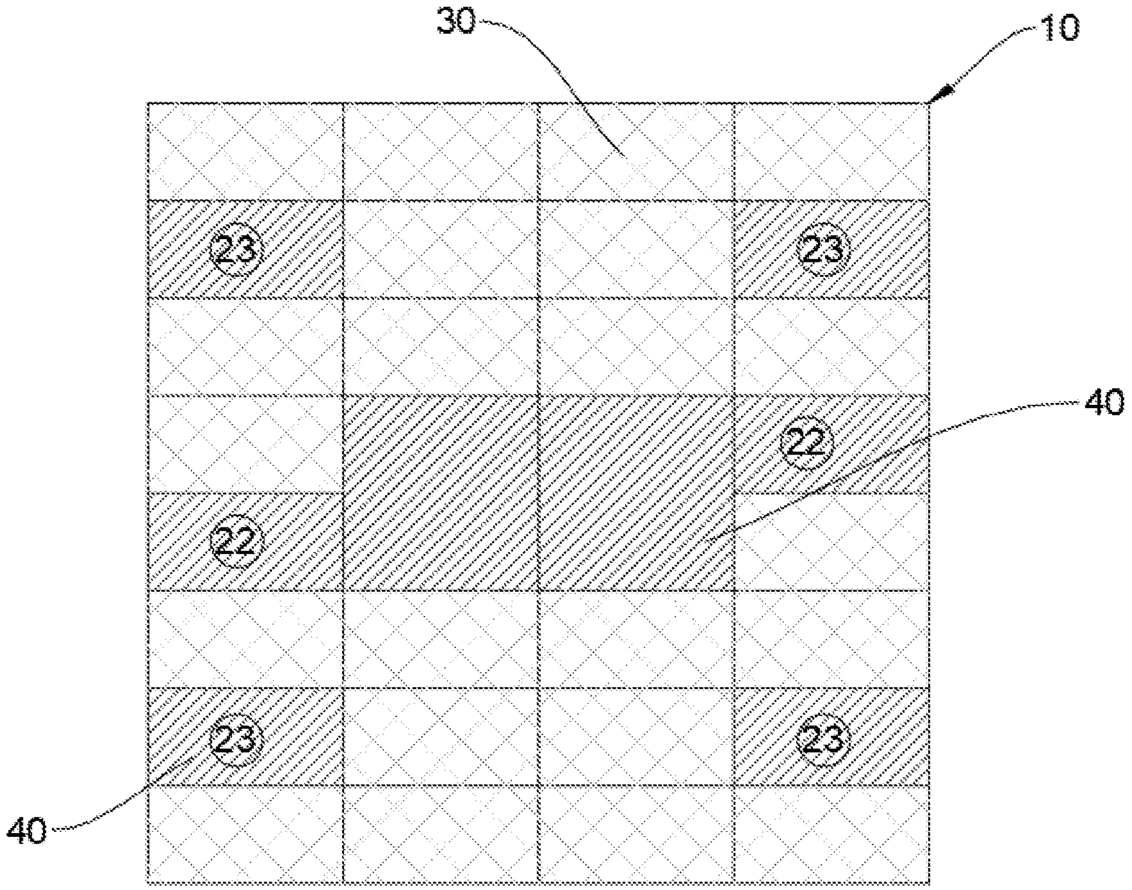
FIG. 12 is a schematic diagram VIII of arrangement structure of a light-emitting module according to an embodiment of the disclosure.

There are three array groups in FIG. 12, respectively the first array group 21, the second array group 22, and the third array group 23 shown in the figure, in the three array groups, the first array group 21 is located in the middle, so that the first array group 21 is the central array group, and the structure of the central array group is the same as that of the central array group shown in FIG. 7. Two array groups sequentially outward from the first array group 21 are the second array group 22 and the third array group 23, and the second array group 22 and the third array group 23 are the peripheral array groups mentioned above.

The second array group 22 contains two second light-emitting units 40, which are distributed in an annular array, and the two second light-emitting units are respectively located on the fourth row of the first column and the fifth row of the fourth column. The third array group 23 contains four second light-emitting units 40, which are distributed in a rectangular array, and the arrangement positions are the same as those of the four second light-emitting units 40 in the second array group 22 in FIG. 5.

Therefore, in some embodiments as shown in FIGS. 11 and 12, in all the light-emitting units in the rectangular light-emitting area 10, the light-emitting units in the previous row and the next row outside the sub light-emitting area all contain the first light-emitting unit 30 and the second light-emitting unit 40. Meanwhile, the light-emitting units in the previous column and the next column outside the sub light-emitting area all contain the first light-emitting unit 30 and the second light-emitting unit 40.

In addition, in the embodiments shown in FIGS. 5-12, each light-emitting unit is of a rectangular shape with the same area and the same direction, of course, in some embodiments, the light-emitting unit may also be of other shapes such as a regular polygon with more than three sides and a circle.

Figure 13:
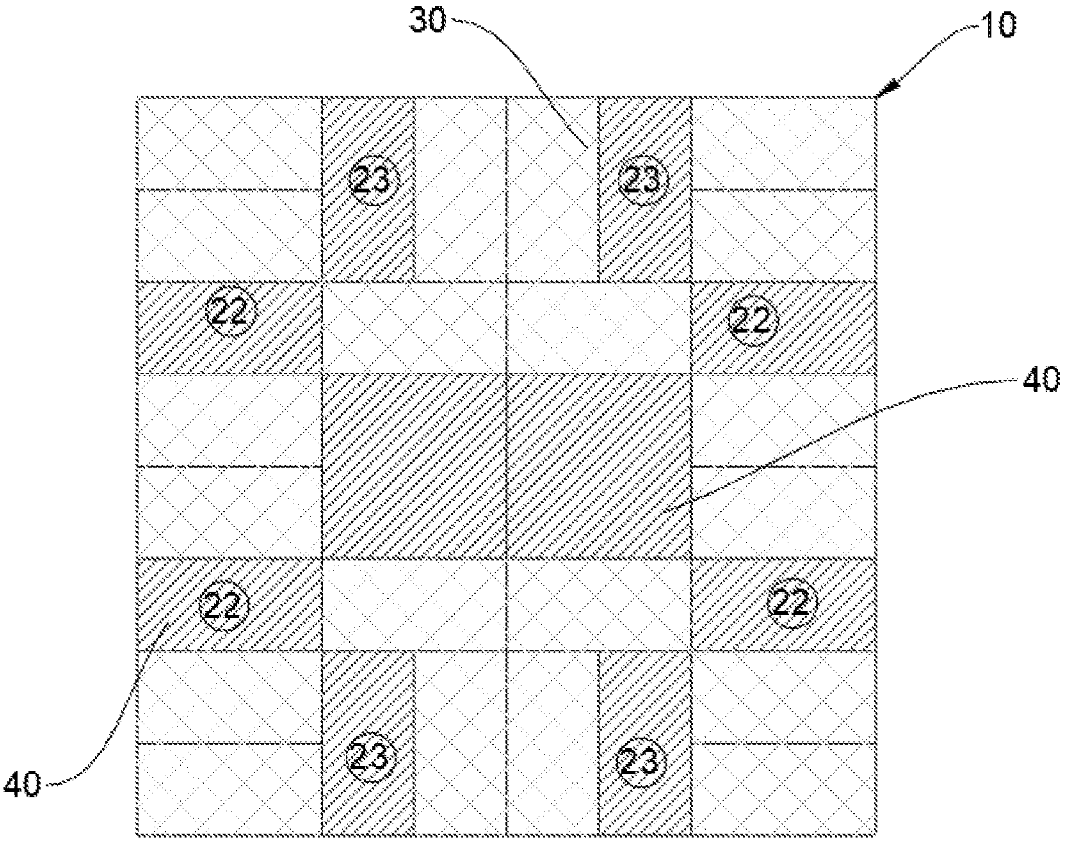
FIG. 13 is a schematic diagram IX of arrangement structure of a light-emitting module according to an embodiment of the disclosure.

Referring to FIG. 13, in the light-emitting module shown in FIG. 13, each light-emitting unit is of a rectangular shape with the same area and includes three array groups, which are sequentially the first array group 21, the second array group 22 and the third array group 23 from inside to outside, the structure of the first array group 21 is consistent with that of the first array group 21 in FIG. 7, which is also the central array group, the second array group 22 and the third array group 23 both contain four second light-emitting units 40, and the second array group 22 and the third array group 23 are both peripheral array groups, which are distributed in a rectangular array. Four second light-emitting units 40 in the second array group 22 are respectively located on the first and the fourth of the third row and the first and the fourth of the sixth row. The length direction of each second light-emitting unit 40 in the second array group 22 is the same as an arrangement direction of each row of light-emitting units in FIG. 5, while the length direction of each second light-emitting unit 40 in the third array group 23 is perpendicular to the arrangement direction of each row of light-emitting units in FIG. 5, that is, the same as the arrangement direction of each column of light-emitting units in FIG. 5. Therefore, the length direction of the first light-emitting unit 30 between two adjacent second light-emitting units 40 in the third array group 23 is also the same as the arrangement direction of each column of light-emitting units in FIG. 5, the two second light-emitting units 40 are adjacent in an annular direction.

It is also to be noted that in some embodiments, the number of the second light-emitting units 40 is an odd number greater than or equal to 3, and the number of the array group is greater than or equal to 2. In such a case, one second light-emitting unit 40 located in the reference center is defined as a reference light-emitting unit 41, and all array groups contain one central array group and at least one peripheral array group. Except the reference light-emitting unit 41, the distance between the second light-emitting unit 40 in the central array group and the reference center is smaller than or equal to the distance between the other light-emitting unit and the reference center, and the second light-emitting unit in each peripheral array group is located at the edge of the rectangular light-emitting area.

Furthermore, in some embodiments, the rectangular light-emitting area has a sub light-emitting area concentric with itself, the length direction and width direction of the sub light-emitting area are respectively in the same direction as the length direction and width direction of the rectangular light-emitting area; and the light-emitting units in the sub light-emitting area contain all second light-emitting units of the reference light-emitting unit and the central array group, and the second light-emitting units of the central array group are all located at the edge of the sub light-emitting area.

Figure 14:
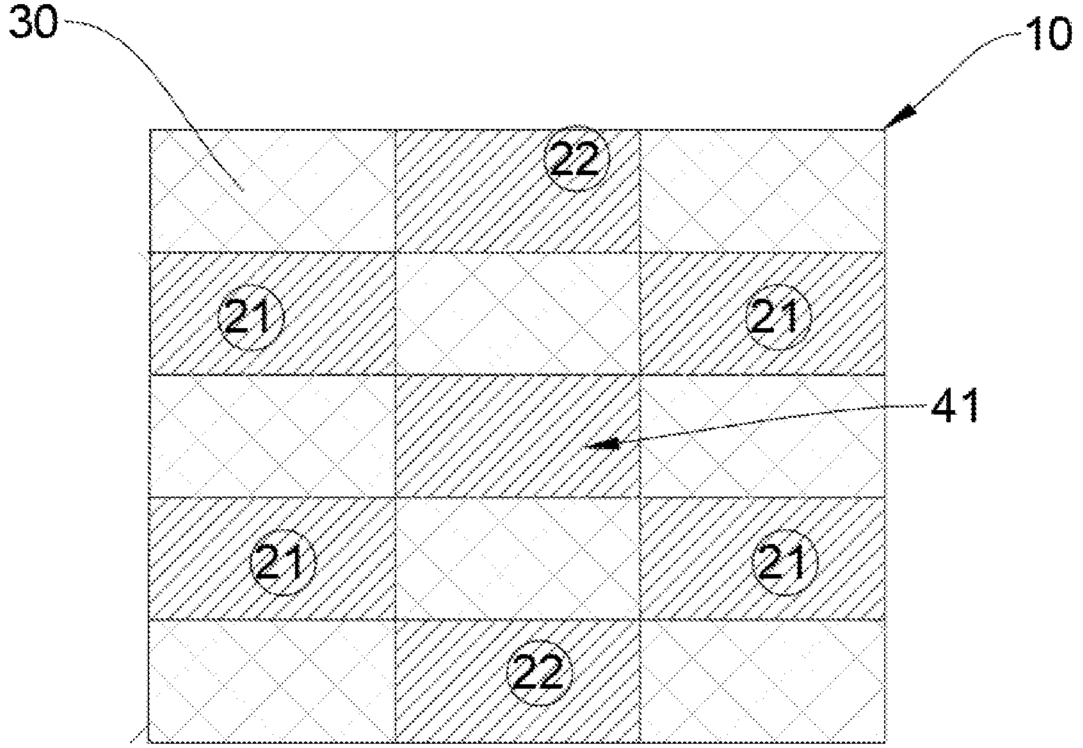
FIG. 14 is a schematic diagram X of arrangement structure of a light-emitting module according to an embodiment of the disclosure.

For example, in the light-emitting module shown in FIG. 14, the number of the second light-emitting unit 40 is an odd number, and all the light-emitting units in the rectangular light-emitting area 10 are arranged in a rectangular array in five rows and three columns. The reference light-emitting unit 41 is located in the third row and the third column.

With further reference to FIG. 14, all the second light-emitting units 40 except the reference light-emitting unit 41 are divided into two array groups, respectively a first array group 21 and a second array group 22, the first array group 21 is the above central array group, all located in the sub light-emitting area, the first array group 21 contains four second light-emitting units 40, the four second light-emitting units in the first array group 21 are distributed in a rectangular array in two rows and two columns, the corresponding sub light-emitting area contains one reference light-emitting unit 41 and four second light-emitting units 40 in the first array group 21, totally five second light-emitting units 40, and the four second light-emitting units 40 in the first array group 21 are respectively on the first column and the third column of the second row and the first column and the third column of the fourth row in all the light-emitting units in the rectangular light-emitting area 10, respectively.

The second array group 22 is the above peripheral array group, which includes two second light-emitting units 40 distributed in an annular array. The two second light-emitting units 40 are respectively on the second column of the first row and the second column of the fifth row in all the light-emitting units in the rectangular light-emitting area 10.

In addition, it is to be noted that in the embodiment, because a plurality of light-emitting units are arranged in a rectangular array, and the whole arrangement is neat and regular, wiring arrangement is convenient, manufacturing and the assembly are also convenient, and manufacturing difficulty and cost are reduced.

In the embodiment, all the light-emitting units are divided into a plurality of electrical modules, each electrical module contains a plurality of connected light-emitting units, and the equivalent resistance values of the electrical modules are the same.

For example, in the light-emitting module shown in FIG. 5, the plurality of light-emitting units in each row or each column server as one electrical module, all the electrical modules are connected in parallel, and the equivalent resistance values of the electrical modules are the same.

In addition, in the light-emitting module shown in FIGS. 5-12, all the light-emitting units in the sub light-emitting area serve as a first electrical module, and the first electrical module is connected to a first power supply.

In the rectangular light-emitting area 10, except the row or column where the light-emitting units forming the first electrical module are located, the other light-emitting units in the same row or column are connected in series to form a second electrical module.

In all the light-emitting units of the rectangular light-emitting area 10, the other light-emitting units except those forming the first electrical module and the second electrical module are connected in series to form a third electrical module.

Wherein, the second electrical module and the third electrical module are connected in parallel to a second power supply. The equivalent resistance values of the first electrical module, the second electrical module and the third electrical modules are the same.

Exemplarily, in FIG. 5, since the four light-emitting units in the sub light-emitting area are in the second column and the third column of the fourth row and the second column and the third column of the fifth row in all the light-emitting units, the four light-emitting units may be connected in series to obtain one first electrical module.

Since the four light-emitting units forming the first electrical module are in the fourth row and the fifth row, all the light-emitting units in the rectangular light-emitting area 10 are in eight rows in total, six rows of light-emitting units are available in addition to the fourth row and the fifth row, light-emitting units in each row of the six rows of light-emitting units serve as one second electrical module, that is, four light-emitting units in each row of the first row, the second row, the third row, the sixth row, the seventh row and the eighth row are connected in series to obtain one second electrical module, and since six rows are available in total, six second electrical modules are obtained.

The other light-emitting units are distributed in the first column and the fourth column of the fourth row and the first column and the fourth column of the fifth row of the rectangular light-emitting area 10, totally, four light-emitting units are connected in series to obtain one third electrical module.

The equivalent resistance values of the first electrical module, the second electrical module and the third electrical modules are the same.

While in FIG. 7, two large chips formed by four second light-emitting units 40 (each two form a whole) located in the sub light-emitting area may serve as one first electrical module. The wiring mode of other light-emitting units may be the same as the wiring mode of the light-emitting unit except that in the sub light-emitting area in FIGS. 5 and 6.

In FIGS. 8, 10, 11 and 12, since four second light-emitting units 40 in the sub light-emitting area are all constructed as a whole to form one large chip, the large chip may serve as one electrical module independently to be connected to one power supply, and the wiring mode of other light-emitting units may be the same as the wiring mode of the light-emitting unit except that in the sub light-emitting area in FIGS. 5 and 6.

In this way, all the light-emitting units in the sub light-emitting area may be independently lightened, and if all the light-emitting units in the sub light-emitting area are second light-emitting units, the effect of detecting dental plaque, dental calculus, tooth cracks and dental caries on teeth by using light with second color with the single color may be achieved.

In addition, it is to be noted that FIGS. 5-13 are only schematic diagrams illustrating arrangement of the light-emitting units in the rectangular light-emitting area 10, and a certain gap may be reserved between any two light-emitting units, so as to facilitate heat dissipation.

Some embodiments of the disclosure further provide a dental photocuring machine, which includes the above light source and at least one power supply for supplying electricity for the light source.

Finally, it is to be noted that the above embodiments serve only to illustrate the technical solutions of the disclosure and not to limit the same; although the disclosure has been described in detail with reference to embodiments, it will be understood by those of ordinary skill in the art that the technical solutions described in the embodiments can still be modified, or part or all of the technical features can be equivalently replaced; and the modification or replacement does not make the essence of the corresponding technical solutions deviate from the scope of the technical solution of each embodiment of the disclosure.

What is claimed is:

1. A light-emitting module, comprising a plurality of light-emitting units arranged in a rectangular array in a rectangular light-emitting area, wherein the rectangular light-emitting area is a smallest rectangular area containing all the plurality of light-emitting units;

all the plurality of light-emitting units are divided into a plurality of first light-emitting units and at least one second light-emitting unit according to different light-emitting colors;

a center of the rectangular light-emitting area is a reference center;

when a number of the at least one second light-emitting unit is one, the second light-emitting unit is located at the reference center;

when a number of the at least one second light-emitting unit is an odd number greater than or equal to 3, one second light-emitting unit is located at the reference center, and the other second light-emitting units are divided into a plurality of array groups;

when a number of the at least one second light-emitting unit is an even number, all the second light-emitting units are divided into a plurality of array groups;

second light-emitting units in each of the array groups are distributed in an annular array or a rectangular array, and distances between second light-emitting units in the same array group and the reference center are equal;

when a number of the each of the array groups is greater than or equal to two, distances between second light-emitting units in at least one array group and the reference center is smaller than distances between second light-emitting units in the other array groups and the reference center;

wherein when the number of the second light-emitting units is an odd number greater than or equal to 3 and the number of the array groups is greater than or equal to 2, all the array groups comprise a central array group and at least one peripheral array group, and one of the second light-emitting units located at the reference center is a reference light-emitting unit;

except the reference light-emitting unit, a distance between a second light-emitting unit in the central array group and the reference center is smaller than or equal to a distance between the other light-emitting unit and the reference center; and a second light-emitting unit in the peripheral array group is located at an edge of the rectangular light-emitting area;

wherein the rectangular light-emitting area has a sub light-emitting area concentric with itself, and the length direction and width direction of the sub light-emitting area are respectively in a same direction as the length direction and width direction of the rectangular light-emitting area;

wherein light-emitting units in the sub light-emitting area contain the reference light-emitting unit and all the second light-emitting units of the central array group, and second light-emitting units of the central array group are all located at an edge of the sub light-emitting area;

wherein all the light-emitting units in the sub light-emitting area serve as a first electrical module, and the first electrical module is connected to a first power supply;

except a row or column where the light-emitting units forming the first electrical module are located, the other light-emitting units in a same row or column are connected in series to form a second electrical module;

the other light-emitting units except those forming the first electrical module and the second electrical module are connected in series to form a third electrical module;

the second electrical module and the third electrical module are connected in parallel to a second power supply;

wherein equivalent resistance values of the first electrical module, the second electrical module and the third electrical modules are the same.

2. The light-emitting module according to claim 1, wherein all the light-emitting units in the sub light-emitting area are the second light-emitting units.

3. The light-emitting module according to claim 1, wherein in each row or column of the light-emitting units in the sub light-emitting area, at least two light-emitting units adjacent and with a same spectral peak wavelength are constructed as a whole structure.

4. The light-emitting module according to claim 1, wherein in all the light-emitting units, light-emitting units in a previous row and a next row outside the sub light-emitting area are all the first light-emitting units.

5. The light-emitting module according to claim 1, wherein in all the light-emitting units, light-emitting units in a previous row and a next row outside the sub light-emitting area all contain the first light-emitting unit and the second light-emitting unit.

6. The light-emitting module according to claim 1, in all the light-emitting units, light-emitting units in a previous column and a next column outside the sub light-emitting area all contain the first light-emitting unit and the second light-emitting unit.

7. The light-emitting module according to claim 1, wherein light-emitting units in each row or each column server as an electrical module;

wherein electrical modules are connected in parallel, and equivalent resistance values of the electrical modules are the same.

8. The light-emitting module according to claim 1, wherein all the light-emitting unit are divided into a plurality of electrical modules, each of the electrical modules contains a plurality of connected light-emitting units, and equivalent resistance values of the electrical modules are the same.

9. The light-emitting module according to claim 8, wherein light-emitting units in each row or each column server as one electrical module of the electrical modules, and all the electrical modules are connected in parallel to a power supply.

10. The light-emitting module according to claim 1, wherein all the first light-emitting units are divided into at least one type of light-emitting units according to different spectral peak wavelengths, and spectral peak wavelengths of first light-emitting units of a same type are the same.

11. The light-emitting module according to claim 10, wherein all the first light-emitting units of the same type are divided into a plurality of arrangement groups;

first light-emitting units in each of the arrangement groups are distributed in an annular array or a rectangular array, and distances between all the first light-emitting units in the each of the arrangement groups and the reference center are equal.

12. The light-emitting module according to claim 10, wherein in the rectangular light-emitting area, in each row or column of the light-emitting units, at least two light-emitting units adjacent and with a same spectral peak wavelength are constructed as a whole structure.

13. A light source, comprising:

a substrate; and the light-emitting module according to claim 1, wherein the light-emitting module is disposed on the substrate.

14. A dental photocuring machine, comprising the light source according to claim 13.

* * * * *